UNITED STATES PATENT OFFICE.

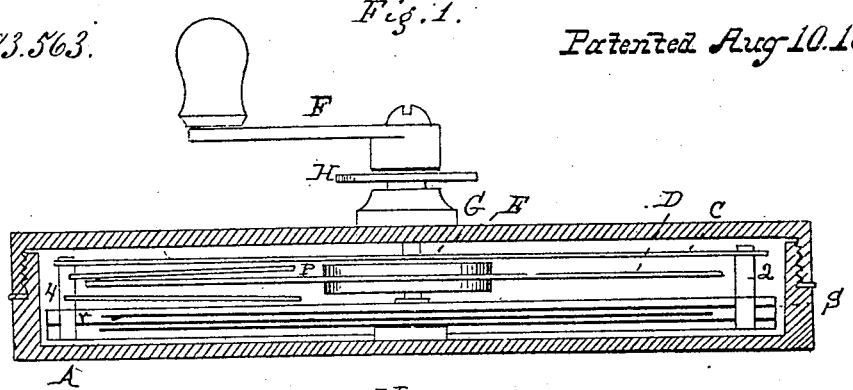
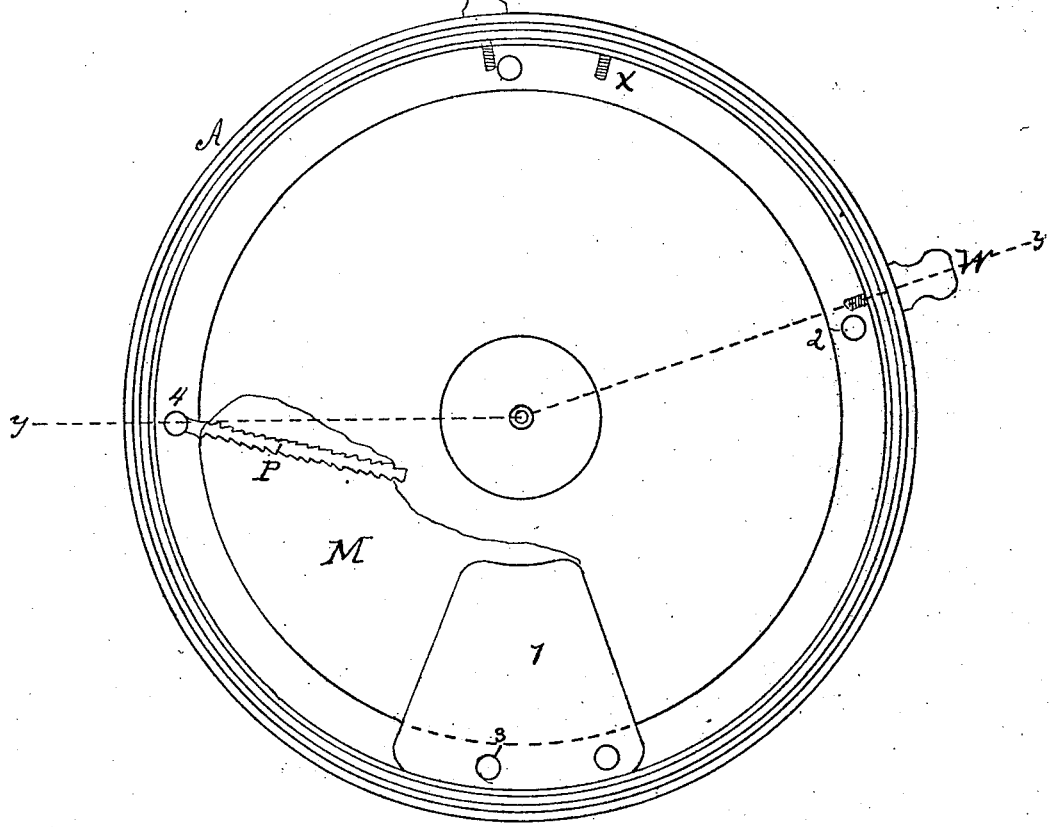

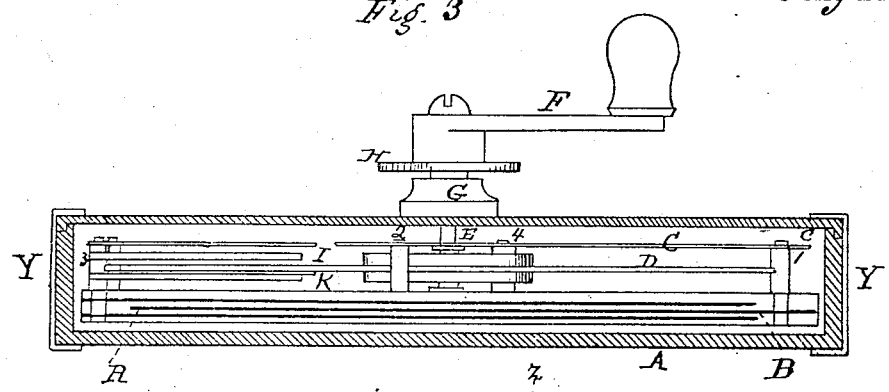
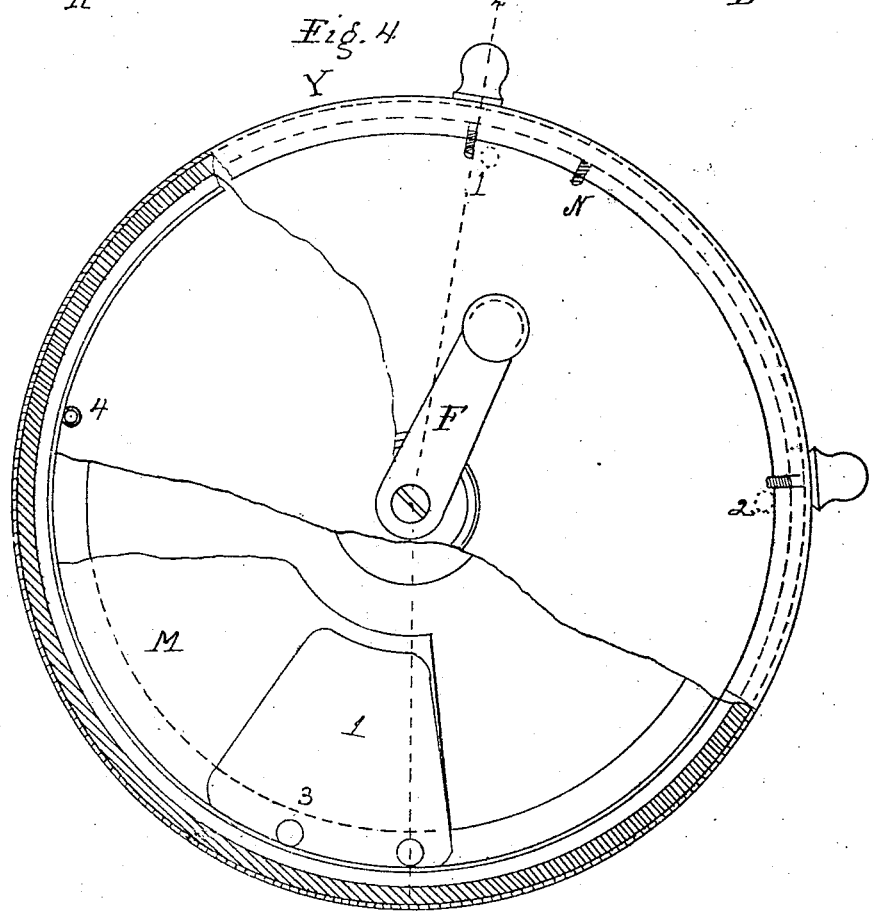

H. JULIUS SMITH, OF BOSTON, MASSACHUSETTS.

IMPROVED ELECTRICAL MACHINE.

Specification forming part of Letters Patent No. 93,563, dated August 10, 1869.

*To all whom it may concern:*

Be it known that I, H. JULIUS SMITH, of Boston, in the State of Massachusetts, have invented an Improved Electrical Machine; and I do hereby declare the following to be a full and correct description of the same, reference being had to the accompanying drawings, in which—

Figure 1 is a vertical section of my electrical machine, showing the collectors. Fig. 2 is a top view of the machine with the cover removed. Fig. 3 is a vertical section, showing the cushions or rubbers. Fig. 4 is a top view with the cover and other parts broken.

The object of this invention is the production of an electrical machine constructed with especial reference to portability and to working in all conditions of the atmosphere. It is designed more especially for igniting charges of powder by means of the electric spark which it evolves.

It is well known that the electrical machine as commonly constructed of glass becomes wholly inefficient in a damp atmosphere such as prevails in tunnels and mines. This is due to the fact that glass so very readily condenses moisture upon its surface in the form of a continuous film. Vulcanite, on the contrary, does not so readily condense moisture, nor does it condense moisture in the form of a film, but, rather, in the form of detached drops.

My machine consists of an outer covering or shallow box containing a frame-plate, C, a Leyden jar or condenser, B, a generating-plate, D, and devices for operating the generating-plate and condenser in connection. The frame-plate, the condenser, and the generating-plate are placed parallel to each other and parallel to the sides of the box, as shown.

The condenser B is connected to the frame-plate C by four posts, 1, 2, 3, and 4. The generating-plate D lies between the condenser and frame-plate, and is revolved on its axis E by means of the handle or crank F. This axis E passes tightly through the stuffing-box G, which may be made to grasp the axis more or less tightly by means of the packing-screw H. The other end of the axis has its bearing in a small hole sunk in the outer vulcanized plate of the condenser. The generating-plate D revolves between two cushions, I and K, the surfaces of which are coated with an amalgam, as is usual with electrical machines. The cushions are provided with flaps, one of which is shown at M, Fig. 2. These flaps serve to prevent the electricity from escaping from the generating-plate D until the excited portion of its surface arrives in the neighborhood of the collectors P, which are serrated strips of metal placed one on each side of the plate D, as seen in Fig. 2, and both collectors are attached to and in metallic connection with the frame-post 4, and by it are brought into connection with the inner plate or surface, $r$, of the Leyden jar or condenser. The two outer plates or surfaces, $s\ s'$, of the condenser are in metallic connection with the post 2 and also with the cushions I and K by means of post 3. The inner plate, $r$, connects with post 1 as well as with post 4.

The condenser B is constructed in the following manner: When the vulcanite is in a plastic state, upon a layer of vulcanite is placed a layer of tin-foil. Over the layer of tin-foil there is placed a second layer of plastic vulcanite, and then a second layer of tin-foil. A third layer of plastic vulcanite, a third of tin-foil, and a fourth of vulcanite complete the jar or condenser. The first and third layers, $s\ s'$, of tin-foil form the outer surfaces of the condenser, the middle layer, $r$, forming the inner surface. Care must be taken that the diameter of the tin-foil plates be less than that of the layer of plastic rubber, excepting a small projection from each tin-foil plate, intended to connect with the posts of the frame. The condenser thus made up is then submitted to the baking or vulcanizing process, at the end of which it becomes hard and rigid. Its surfaces $s$, $s'$, and $r$ will forever remain in a perfectly dry condition. The posts 1, 2, 3, and 4 are now screwed into the condenser B, posts 1 and 4, as before stated, connecting with the inner surface, $r$, while posts 2 and 3 connect with the outer surfaces, $s\ s'$.

To the outer casing, A, are attached two knobs, V and W. These knobs are electrodes or paths for the discharge of the electricity when they are brought into contact with the inner and outer surfaces, $r$ and $s\ s'$, of the condenser, which is done by turning the handle of the machine backward a little until the post 1 comes into contact with a projection from the knob V, and the post 2 comes into contact with the projection from the knob W.

There is a stop, X, which serves to prevent the frame-work of the machine from revolving by the action of the crank, except through a small arc. The post 1 is limited in its forward motion by the stop X and in its backward motion by the projection from the knob V.

The casing A is made of vulcanite. Two forms of casing are shown in the drawings—one a box in halves, which are screwed together, with a packing of soft rubber or other air-tight material between them, (seen in Fig. 1;) the other a box with a cover, as shown in Fig. 3, having a rubber band placed over and around the outer edge. I prefer the first described.

The operation of the machine is as follows: By turning the crank F the generating-plate is revolved between the cushions I and K. The electricity generated is collected by the collectors P P, and from them carried by post 4 to the inner surface, r, of the condenser. The opposite electricity, appearing at the rubbers I K, is conducted from them by post 3 to the outer surface, s s', of the condenser. By continued turning of the crank the condenser may be charged sufficiently to give a spark of three-eights or one-half an inch in small machines of five or six inches in diameter. The first motion of the crank turns the frame as well as the generating-plate until post 1 strikes the stop X. Turning the crank backward brings posts 1 and 2 in contact with the knobs V and W, when the condenser may be discharged. It is desirable that the condenser be discharged by the posts 1 and 2 rather than by posts 3 and 4, which are used for charging, as the tendency to escape during accumulation is thereby avoided. The frame-plate and the generating-plate are both made of plastic rubber and vulcanized.

The capacity of a Leyden jar or condenser constructed of plastic rubber and metallic plates, as above directed, may be increased by adding successive layers of metal and vulcanite. Such a condenser will be of use for electrical purposes, independently of the generating apparatus herein described.

I claim—

1. A generating-plate and a flat condenser placed parallel to each other within the same casing, substantially as described.

2. A Leyden jar or condenser constructed of vulcanized rubber and metallic plates, substantially as described.

3. So arranging the jar or condenser that the forward motion of the crank to generate electricity and charge the jar moves the jar forward through a small arc, whereby its terminals are moved away from the discharging-knobs.

4. The device for discharging the jar by the retrograde motion of the crank bringing the posts 1 and 2 into contact with the projections from knobs V and W.

5. Placing the firing-points of the condenser at a distance from the collecting-points, substantially as described.

6. The stop $x$, limiting the forward movement of the jar, substantially as described.

7. The combination of a generating-plate, a condenser, and a casing made air-tight, as described, by packing or a rubber band, together with knobs in the casing and their projections, by which the condenser is discharged, substantially as described.

The above specification of my said invention signed and witnessed at Boston this 21st day of June, A. D. 1869.

H. JULIUS SMITH.

Witnesses:
W. W. SWAN,
W. W. JACKSON.